United States Patent
Bala et al.

(10) Patent No.: US 9,111,477 B2
(45) Date of Patent: Aug. 18, 2015

(54) LANGUAGE-BASED COLOR CALIBRATION OF DISPLAYS

(75) Inventors: Raja Bala, Pittsford, NY (US); Karen M. Braun, Fairport, NY (US); Robert J. Rolleston, Rochester, NY (US); George A. Gibson, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 200 days.

(21) Appl. No.: 13/193,955

(22) Filed: Jul. 29, 2011

(65) Prior Publication Data

US 2013/0027421 A1 Jan. 31, 2013

(51) Int. Cl.
*H04N 1/60* (2006.01)
*G09G 5/02* (2006.01)
*H04N 9/68* (2006.01)

(52) U.S. Cl.
CPC ............... *G09G 5/02* (2013.01); *H04N 1/6033* (2013.01); *H04N 1/6038* (2013.01); *H04N 9/68* (2013.01); *G09G 2320/0666* (2013.01); *G09G 2320/0693* (2013.01)

(58) Field of Classification Search
CPC ..... G09G 5/02; H04N 1/6033; H04N 1/6038; H04N 9/68
See application file for complete search history.

(56) References Cited

U.S. PATENT DOCUMENTS

| | | | |
|---|---|---|---|
| 5,381,349 A * | 1/1995 | Winter et al. | 382/167 |
| 6,222,648 B1 * | 4/2001 | Wolf et al. | 358/504 |
| 6,956,580 B2 * | 10/2005 | Rozzi | 345/589 |
| 7,312,799 B2 | 12/2007 | Klassen et al. | |
| 7,986,298 B1 * | 7/2011 | Dulaney et al. | 345/156 |
| 8,487,955 B2 | 7/2013 | Bala et al. | |
| 2002/0180751 A1 * | 12/2002 | Rozzi | 345/589 |
| 2006/0227148 A1 | 10/2006 | Klassen et al. | |
| 2006/0247877 A1 | 11/2006 | Bala et al. | |
| 2008/0003547 A1 * | 1/2008 | Woolfe et al. | 434/98 |
| 2008/0007749 A1 | 1/2008 | Woolfe | |
| 2009/0021587 A1 | 1/2009 | Snyderman et al. | |
| 2010/0110455 A1 | 5/2010 | Woolfe | |
| 2011/0128558 A1 | 6/2011 | Stevens et al. | |

FOREIGN PATENT DOCUMENTS

JP 11194866 7/1999

OTHER PUBLICATIONS

Balasubramanian, R., et al., "Demonstration of Color Match Between Display and Print", www.tipmagazine.com/colordemo/, Xerox Corporation, 2001.

(Continued)

*Primary Examiner* — Ke Xiao
*Assistant Examiner* — Raffi Isanians
(74) *Attorney, Agent, or Firm* — Fay Sharpe LLP

(57) ABSTRACT

Described herein is a method of calibrating displays (or printers) using Natural Language-based commands. The exemplary method provides an easy-to-use solution to the common methods of color calibrating a display. Instead of using sliders or manual controls for the individual dimensions of a three-dimensional color problem, the user is able to make adjustments via natural language commands, such as "make reference patch less purple." The method does not require the user to understand color mixing technology when making separate R, G, and B adjustments to match a specified patch. A user can easily express the necessary color adjustment in natural language terms, making the process simpler and faster.

20 Claims, 6 Drawing Sheets

(56) References Cited

OTHER PUBLICATIONS

Stokes, Michael, et al., "A Standard Default Color Space for the Internet: sRGB", www.color.org/Srgb.xalter, Version 1.10, Nov. 5, 1996, p. 1-11.

Hardeberg, Jon Y., et al., "Colorimetric Characterization of Projection Displays Using a Digital Colorimetric Camera", Projection Displays /X. Ming H. Wu, Editor, Proceedings of SPIE-IS&T Electronic Imaging SPIE vol. 5002 (2003).

Bala, Raja, Digital Color Imaging Handbook, Chapter 5: Device Characterization, Xerox Imaging & Services Technology Center, Webster, New York.

Cowan, William B., "An Inexpensive Scheme for Calibration of a Colour Monitor in Terms of CIE Standard Coordinates", Computer Graphics, vol. 17, No. 3, pp. 315-321.

\* cited by examiner

LANGUAGE-BASED COLOR CALIBRATION OF DISPLAYS

BACKGROUND

The embodiments disclosed herein relate to a color calibration system, and, more particularly, to natural language-based systems for color calibration of displays.

By way of background, each color display device (e.g., CRT monitor, flat panel LCD, etc.) typically exhibits its own unique color characteristics and tone response. Unless these characteristics are corrected for, poor image quality can result, and/or the same image may reproduce differently on different devices. Color calibration is a means to correct for such display characteristics. The aim of color calibration is to measure and/or adjust the color response of a device (input or output) to establish a known relationship between the device color signals and a standard color space. Color calibration is a requirement for all devices taking an active part of a color managed workflow.

Many color calibration techniques exist, most of which require a measurement device, such as a colorimeter or spectrophotometer, in conjunction with a color profiling application. To suit the more casual/novice user, a class of measurement-free techniques also exist, which rely upon simple visual color matching tasks using standard graphical user interface (GUI) widgets such as sliders and knobs.

There exists, however, a need for a simpler alternative to the common methods of color calibrating a display that does not rely on using sliders and/or manual controls for the individual dimensions of a three-dimensional color problem.

INCORPORATION BY REFERENCE

The following references, the disclosures of which are incorporated in their entireties by reference, are mentioned:

U.S. Pub. No. 2008/0007749, published Jan. 10, 2008, entitled NATURAL LANGUAGE COLOR COMMUNICATION AND SYSTEM INTERFACE, by Geoffrey J. Woolfe, discloses a natural language control system with a dictionary of color terms from pre-existing dictionaries for adjusting colors in images.

U.S. Pub, No. 2009/0021587, published Jan. 22, 2009, entitled METHOD, SYSTEM AND APPARATUS FOR JOINTLY CALIBRATING COLOR DIGITAL CAMERAS AND MONITORS, by David Snyderman et al., discloses a method for calibrating and characterizing a color display.

An article entitled "An Inexpensive Scheme For Calibration Of A Colour Monitor In Terms Of CIE Standard Coordinates", published in Computer Graphics, vol. 17, No. 3, pp. 315-321 by William B. Cowan, discloses a technique for display calibration involving adjusting the luminance of a stimulus to obtain a visual luminance match to a reference binary halftone pattern of ON and OFF pixels.

U.S. Pat. No. 7,312,799, issued Dec. 25, 2007, entitled VISUAL DETERMINATION OF GAMMA FOR SOFTCOPY DISPLAYS, discloses a method for deriving gamma for a display monitor involving both luminance matching and gray-balancing.

U.S. Pub. No. 2008/0003547, published Jan. 3, 2008, entitled NATURAL LANGUAGE COLOR SELECTION AND NAVIGATOR FOR SELECTING COLORS FROM A COLOR SET, by Geoffrey J. Woolfe et al., discloses systems and methods that allow users to input natural language commands to perform color selection.

BRIEF DESCRIPTION

Described herein is an exemplary method of calibrating color display devices such as CRT monitors and LCD flat panels (or printers) using natural language-based commands. The exemplary method provides an easy-to-use alternative to the common methods of color calibrating a display. Instead of using sliders or manual controls for the individual dimensions of a three-dimensional color problem, the user is able to make adjustments via intuitive natural language commands, such as "make reference patch less purple." The exemplary method does not require the user to understand color mixing technology when making separate R (red), G (green), and B (blue) adjustments to match a specified patch. A user can easily express the necessary color adjustment in natural language terms, thus making the process simpler and faster. In this regard, the exemplary method uses language-based commands in conjunction with a graphical user interface to perform color calibration of a display. The steps generally include: i) displaying a target, such as a 50% R=G=B stimulus (i.e, a color stimulus), against a background of an alternating high-frequency black-and-white pattern (i.e., a fixed reference stimulus); ii) prompting the user to input language commands to adjust the color stimulus until it appears gray and of equal lightness with respect to the fixed reference stimulus; and iii) using the RGB values of the resulting adjusted color stimulus to derive one or more calibration tone response curves (TRCs) for the display.

In one embodiment a computer-implemented method for color calibration of a color display device is provided. The method includes presenting on the display device a color stimulus; receiving from a user one or more natural language commands to adjust the color stimulus until it appears to visually match a fixed reference stimulus, wherein an adjusted color stimulus comprises a set of digital values; using the digital values of the adjusted color stimulus to derive a calibration function for the display device; and applying the calibration function to produce corrected colors on the display device.

With regard to the method described in the preceding paragraph, the color stimulus could be a gray patch and/or the fixed reference stimulus could be a 50% binary halftone pattern alternating between white and black stimuli. Also, such method(s) could include providing a graphical user interface on the display device that includes a calibrate command that is used to derive a calibration TRC and/or a test command that is used to bring up a pre-designed test image before and after calibration to show the user an improvement obtained from the calibration function.

In another embodiment a microprocessor-based system for color calibration of a color display device is provided. The system includes a graphical user interface that is operative to present on the display device a color stimulus and receive from the user one or more natural language commands to adjust the color stimulus until it appears to visually match a fixed reference stimulus, wherein an adjusted color stimulus comprises a set of digital values. The system may also include a controller that is operative to use the digital values of the adjusted color stimulus to derive a calibration function for the display device and apply the calibration function to produce corrected colors on the display device.

With regard to the microprocessor-based system for color calibration of a color display device described in the preceding paragraph, the color stimulus could be a gray patch and/or the fixed reference stimulus could be a 50% binary halftone pattern alternating between white and black stimuli. Also, such system(s) could include a graphical user interface on the display device that includes a calibrate command that is used to derive a calibration TRC and/or a test command that is used to bring up a pre-designed test image before and after calibration to show the user an improvement obtained from the calibration function.

In yet another embodiment a non-transitory computer-usable data carrier is provided. The data carrier stores instructions that, when executed by a computer, cause the computer to: present on a color display device a color stimulus; receive from a user one or more natural language commands to adjust the color stimulus until it appears to visually match a fixed reference stimulus, wherein an adjusted color stimulus comprises a set of digital values; use the digital values of the adjusted color stimulus to derive a calibration function for the display device; and apply the calibration function to produce corrected colors on the display device.

With regard to the method described in the preceding paragraph, the color stimulus could be a gray patch and/or the fixed reference stimulus could be a 50% binary halftone pattern alternating between white and black stimuli. Also, such method(s) could include providing a graphical user interface on the display device that includes a calibrate command that is used to derive a calibration TRC and/or a test command that is used to bring up a pre-designed test image before and after calibration to show the user an improvement obtained from the calibration function.

DETAILED DESCRIPTION

Figure 1:
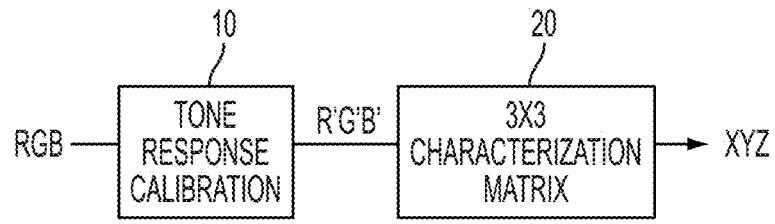
FIG. 1 is a block diagram representing color calibration and characterization of display devices.

Display devices generally conform to an additive color mixing model. According to this model, the relationship between RGB signals driving the device and XYZ tristimulus values produced by the display may be illustrated as shown in FIG. 1.

The first step (10) is tone response calibration, which linearizes each of the R (red), G (green), and B (blue) channels to luminance. In the second step (20), the linearized signals R', G', B' are related to XYZ tristimulus values via a 3×3 characterization matrix, as determined by the colors of the R, G, B phosphors and the display white point. For greatest accuracy, both the tone calibration and the 3×3 matrix should be derived for each display. However, for many practical applications, sufficient accuracy can be achieved by deriving only the tone calibration, and using a fixed generic 3×3 characterization matrix such as the sRGB standard. As known in the art, sRGB is a standard RGB color space for use on monitors, printers, and the Internet. The exemplary method focuses on improvements in tone response calibration.

Figure 2:
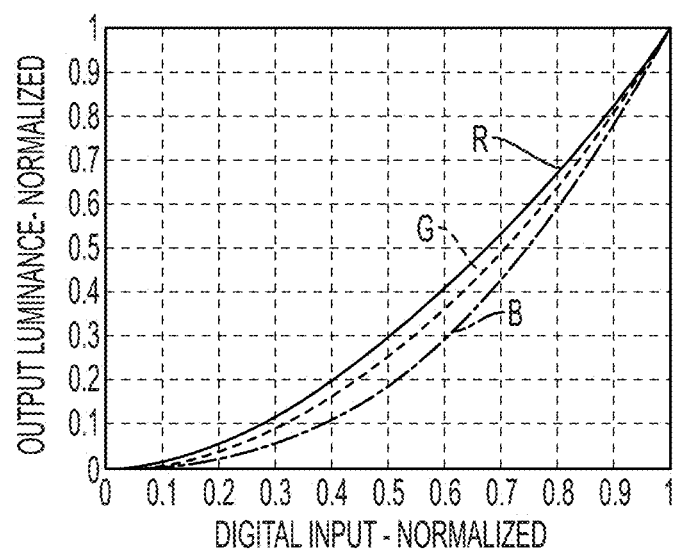
FIG. 2 is a graph showing display tone response modeled by a gamma-function.

The tone response of a typical cathode ray tube (CRT) display may be accurately modeled by a gamma-offset-gain (GOG) model. A common simplification is to assume offset=0, gain=1. This reduces the model to:

$$R'=R^\gamma \; G'=G^\gamma \; B'=B^\gamma \quad (1)$$

where R,G,B and R',G',B' are normalized to the maximum luminance of each primary so that their values are in the range 0-1. The plot in FIG. 2 shows an example of the gamma function for RGB. For illustration, different gamma values are used for each of the channels in this figure: $\gamma_R=1.8$, $\gamma_G=2.0$, $\gamma Y_B=2.4$.

Due to the historical predominance of CRT displays, it has been common practice to prepare electronic RGB images for rendition to such devices. In recognition of this fact, the sRGB color space was developed to represent an average CRT display and serves today as one of the main de-facto standards for electronic RGB imagery. Indeed, many scanner and digital camera manufacturers apply post-processing to the captured images to transform them approximately to sRGB. Similarly, many non-CRT displays (e.g., LCDs, etc.) are often tuned to approximate a gamma response.

It should be noted that, since the gamma function is uniquely determined by a single parameter, in principle, the function can be entirely derived by a single measurement at a known input digital value.

The parameters of the calibration and characterization functions can be readily derived by making colorimetric or spectral measurements at certain digital RGB values and using known algorithms. Recognizing the fact that color sensing instrumentation adds cost and labor to the calibration process, several cheaper alternatives have been proposed. One such alternative involves the use of a digital camera as a surrogate for a colorimetric sensor. See, for example, U.S. Pub. No. 2009/0021587, published Jan. 22, 2009, entitled METHOD, SYSTEM AND APPARATUS FOR JOINTLY CALIBRATING COLOR DIGITAL CAMERAS AND MONITORS, by David Snyderman et al., which discloses a method for calibrating and characterizing a color display. In that case, the camera itself must be calibrated to approximate the response of a colorimetric device.

Figure 3:
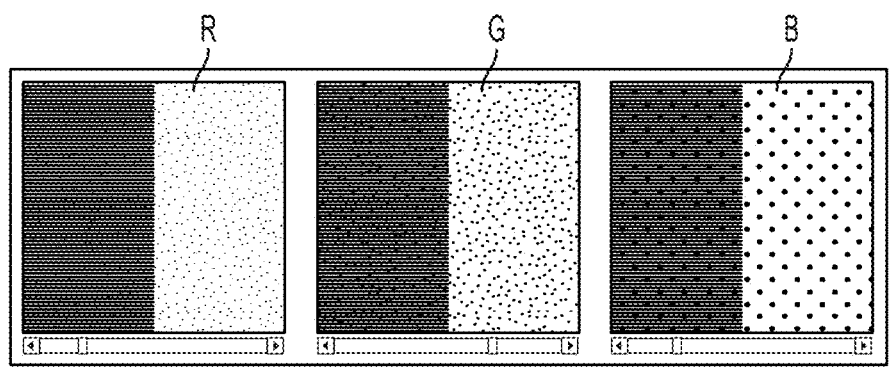
FIG. 3 represents a standard visual display calibration task.

Another class of techniques involves visual tasks. See, for example, U.S. Pub. No. 2006/0247877, published Nov. 2, 2006, entitled VISUAL MONITOR CALIBRATION, by Raja Bala et al., which discloses a method for deriving gamma for a display monitor that does not involve color matching tasks. The classic method involves adjusting the RGB values of a stimulus until it matches an invariant reference background comprising a high-frequency binary pattern of alternating full-on and full-off signal. This is shown in FIG. 3, which represents a standard visual display calibration task. For each of R, G, and B the sliders are adjusted until the luminance of the right field matches the average luminance of the binary pattern on the left. The task establishes one [x-y] pair on the display tone response curve, which is sufficient to determine the γ parameter, which in turn defines the entire tone response.

The so-called "natural language" description of color has been used for providing an intuitive means of describing and adjusting colors in images. See, for example, U.S. Pub. No. 2008/0007749, published Jan. 10, 2008, entitled NATURAL LANGUAGE COLOR COMMUNICATION AND SYSTEM INTERFACE, by Geoffrey J. Woolfe, which discloses a natural language control system with a dictionary of color terms from pre-existing dictionaries for adjusting colors in images, and U.S. Pub. No. 2008/0003547, published Jan. 3, 2008, entitled NATURAL LANGUAGE COLOR SELECTION AND NAVIGATOR FOR SELECTING COLORS FROM A COLOR SET, by Geoffrey J. Woolfe et al., which discloses systems and methods that allow users to input natural language commands to perform color selection.

The language command for adjusting a color may be parsed into at least three components: i) the name of a target color or set of colors to be adjusted; ii) a direction in which the adjustment takes place (e.g., it could be specified in terms of moving towards or away from another color); and iii) the magnitude of change along that direction. These three pieces of information are a minimum requirement for any color adjustment. Additional information might be required to more fully specify the required adjustment before it can be made.

An example of such a command would be:
"Make all light blues much less purple".
This command can be parsed into the three components mentioned above:

Make [all light blues]$_i$ [much]$_{iii}$ [less purple]$_{ii}$.

where "all light blues" represents the name of a target color or set of colors to be adjusted, "less purple" represents the direction in which the adjustment takes place, and "much" represents the magnitude of change along that direction.

Figure 4:
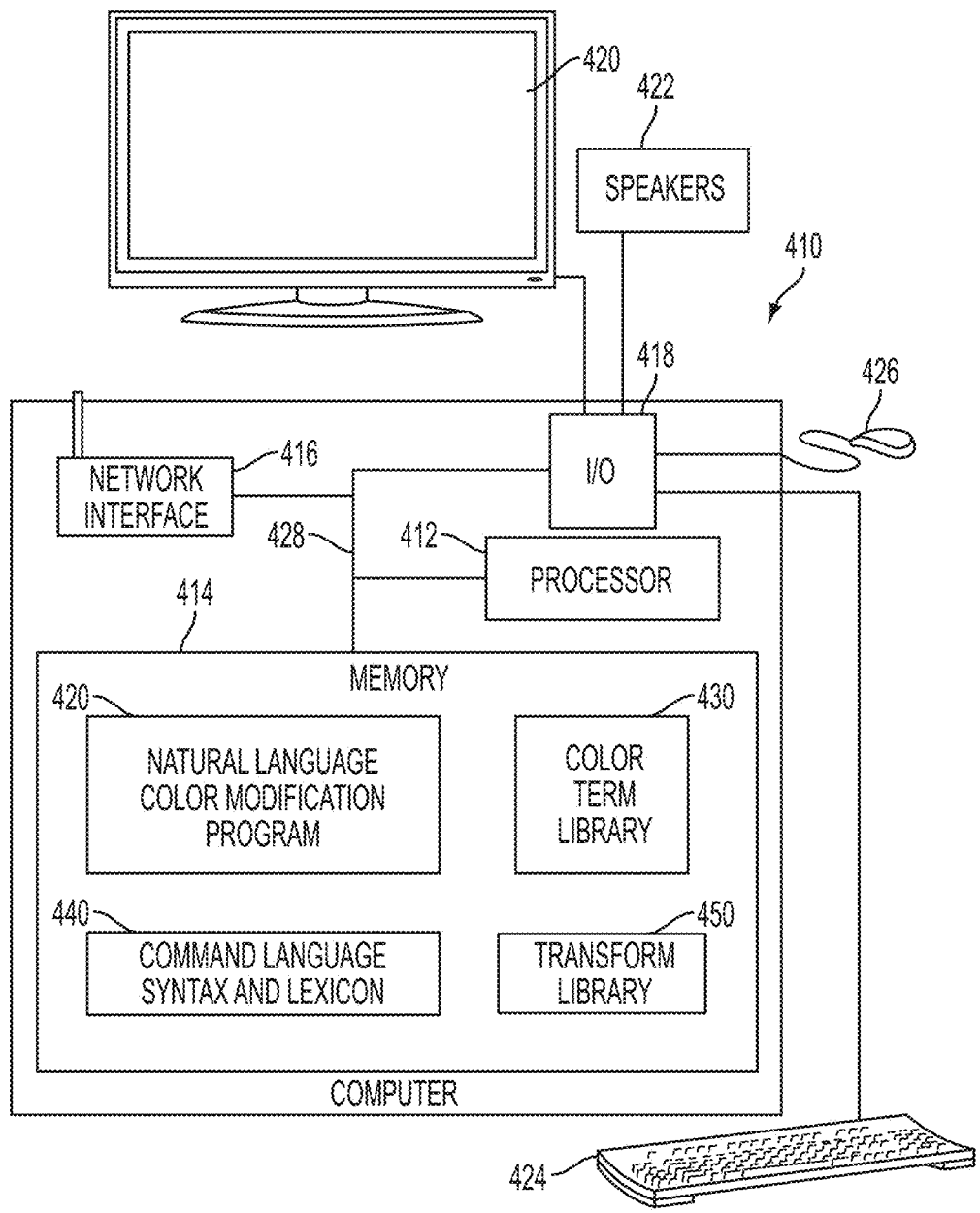
FIG. 4 is a functional block diagram of a computer system suitable for implementing the exemplary method.

We turn now to FIG. 4, which shows a functional block diagram of an exemplary computer system 410 that may implement the exemplary method. The illustrated computer system 410 generally includes components such as a processor 412, which controls the overall operation of the computer system 410 by execution of processing instructions which may be stored in memory 414 connected to the processor 412. The computer system 410 may also include a network interface 416 and a user input output interface 418. The I/O interface 418 may communicate with one or more of a display 420 (e.g., a CRT or an LCD monitor), for displaying information to users, speakers 422, and a user input device, such as a keyboard 424 or touch or writable screen, for inputting text, and/or a cursor control device 426, such as mouse, trackball, or the like, for communicating user input information and command selections to the processor 412. The various components of the computer may be connected by a bus 428. The processor 412 typically executes instructions for performing the exemplary method outlined in FIG. 5 as well as other algorithms. The computer system 410 may be, for example, a mainframe, desktop, laptop, or palmtop computer or a specialized device for modifying color.

Figure 5:
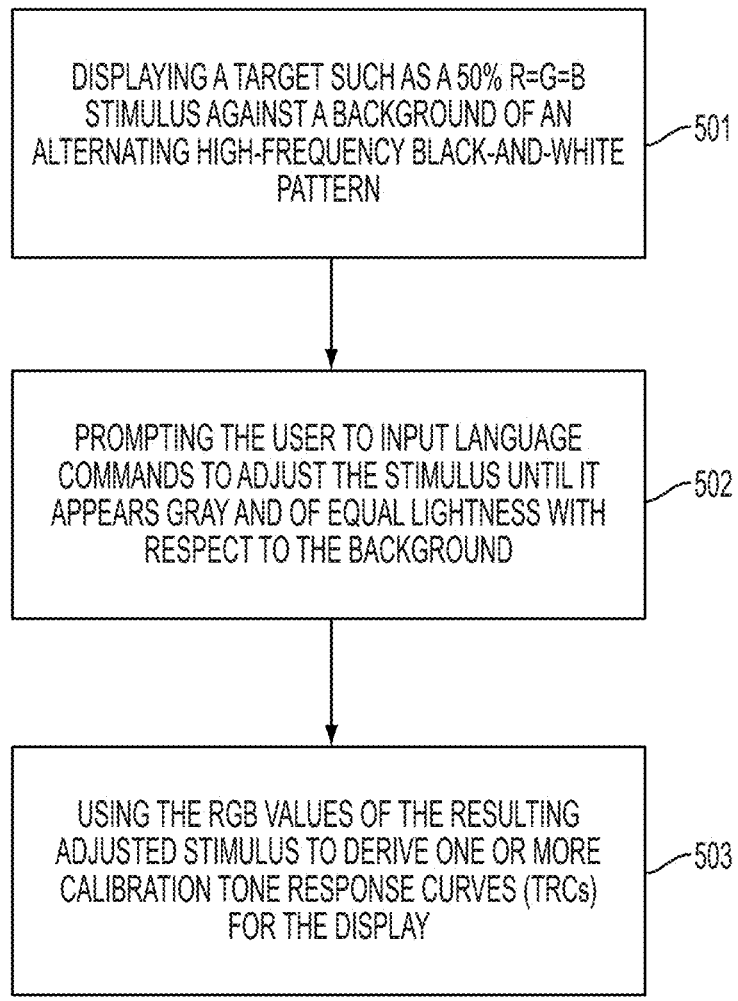
FIG. 5 is a flow chart illustrating an embodiment of the exemplary method.
Figure 6:
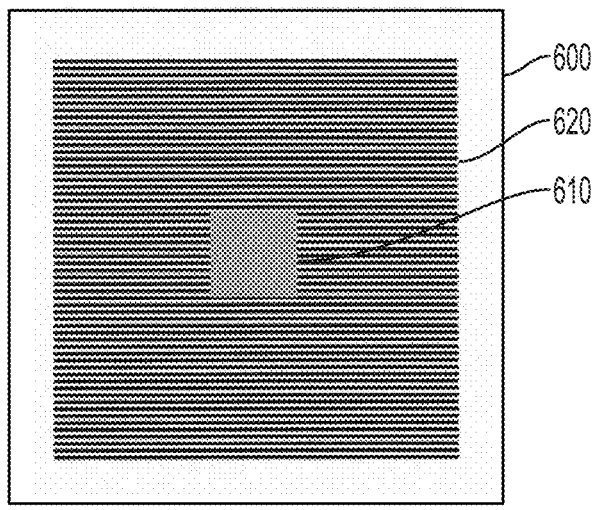
FIG. 6 is an example of a suitable target for use in the exemplary method.

Memory 414 holds the instructions for the natural language color modification system 420 described with respect to FIGS. 4-6. Memory 414 may also hold a natural language color term dictionary 430 containing ordinary language color terms that correspond to portions of a working color space, the command term lexicon and syntax 440, and a transform library 450.

The memory 414 may represent any type of computer readable medium, external or internal, such as random access memory (RAM), read only memory (ROM), magnetic disk or tape, optical disk, flash memory, or holographic memory. In embodiments, the memory 414 comprises a combination of these elements. For example, the natural language color term dictionary may be stored on a hard drive while the color modification process instructions may be stored in RAM on a chip. In some embodiments, the processor 412 and memory 414 may be combined in a single chip. The network interface 416 allows the computer to communicate with other devices via a computer network, such as a local area network (LAN) or wide area network (WAN), or the internet, and may comprise a modulator/demodulator (MODEM).

As will be appreciated, FIG. 4 is a high level functional block diagram of only a portion of the components which are incorporated into a computer system 410. Since the configuration and operation of programmable computers are well known, they will not be described further.

The exemplary method combines the concepts of visual color matching and color adjustment based on natural language commands to provide a novel means of calibrating a color display that involves no measurement and is intuitive and easy to use. Namely, the exemplary method may be used for color calibration of a color display and employs language-based commands in conjunction with a graphical user interface to accomplish a visual matching task. With reference now to FIG. 5, the preferred embodiment of the method is described below. Note that the acts are listed in a particular order in the flowchart. However, this order should not be considered limiting, as the order of many of these acts may be changed without affecting the resulting color calibration system.

Initially, a suitable target is displayed on the display 420 (501). An example of a suitable target 600 for use in the exemplary method is shown in FIG. 6. In this regard, the target 600 may comprise, for example, a color stimulus 610, such as a 50% R=G=B stimulus, against a fixed reference stimulus 620, such as a background comprising an alternating high-frequency black-and-white pattern. Note that scaling may produce moiré artifacts in this figure that are not seen in the actual GUI.

Figure 7:
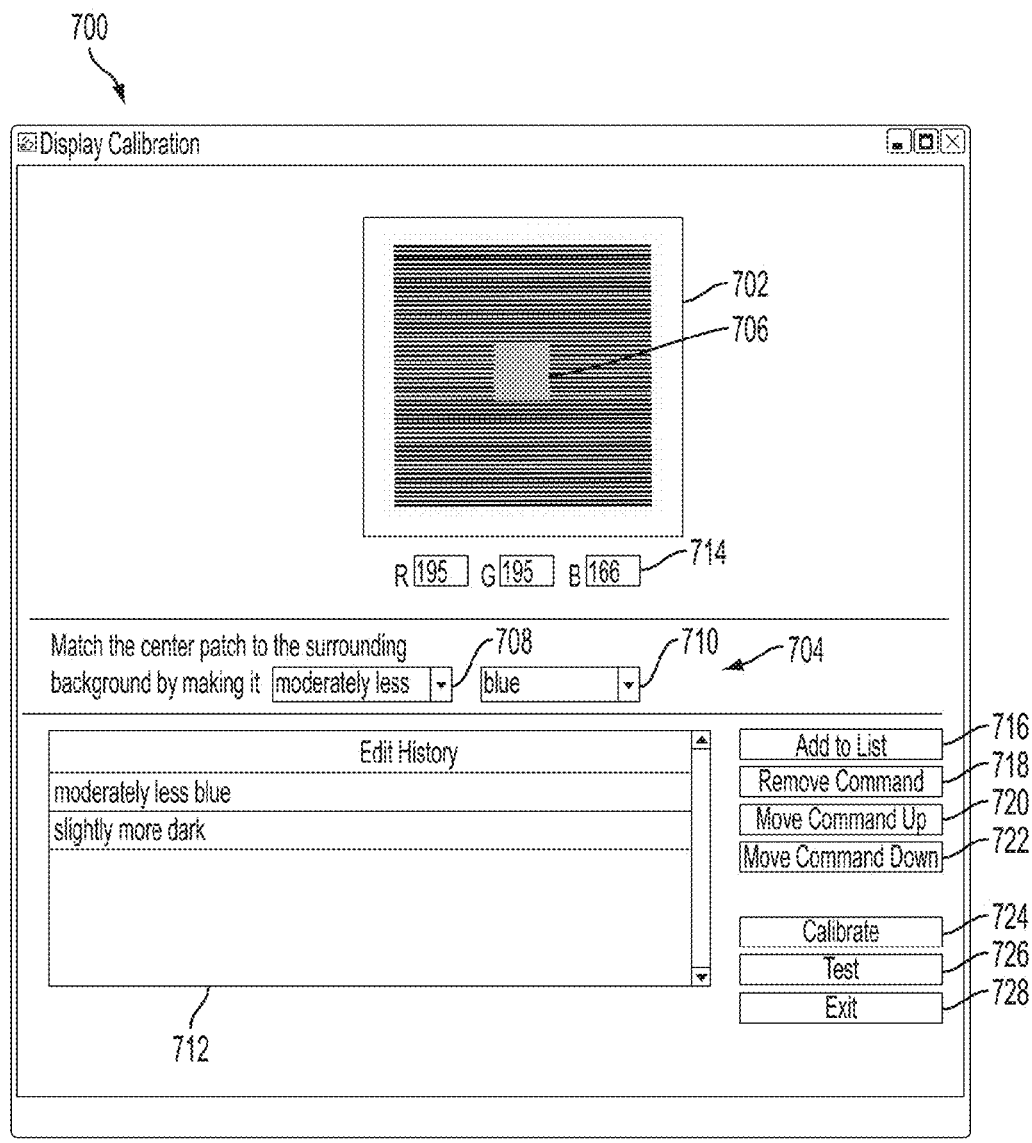
FIG. 7 shows a screenshot of the language-based color editing GUI adapted for the display calibration task.

Further, FIG. 7 shows a screenshot of an exemplary language-based color editing GUI 700 adapted for the display calibration task. The GUI 700 includes various features, including a target 702, similar to the target 600 shown in FIG. 6. It is to be understood, however, that other types of targets may be used. As shown, the GUI 700 may also include one or more natural language pull-down menus 704 for making changes to the center patch (i.e., the color stimulus) 706 of the target 702. For example, one pull-down menu 708 may be used to indicate the direction in which the adjustment takes place, and another pull-down menu 710 may be used to indicate the magnitude of change along that direction. An "Edit History" listing 712 may also be included on the GUI 700. The GUI 700 may also show the final adjusted RGB values 714 producing the visual match for the particular display.

The GUI 700 may include additional buttons to perform various actions, including, but not limited to, an "Add to List" button 716, a "Remove Command" button 718, a "Move Command Up" button 720, and a "Move Command Down" button 722. A "Calibrate" button 724 may be used derive a calibration TRC. A "Test" button 726 may be used to bring up a pre-designed test image before and after calibration, so that the user can appreciate the improvement obtained from the calibration process. An "Exit" button 728 may be used to end the display calibration process. It is to be understood that this is just an exemplary GUI, and that obvious variants can be conceived (such as different locations for the various widgets, and alternatives to pull-down menus such as radio button, check-box, etc.)

It is noted that, alternatively, the gray stimulus 610 being adjusted could be replaced by some other color (e.g., 50% of pure red, green, or blue primaries). Also, the fixed reference stimulus 620 could be something other than the binary pattern shown in the figures. Preferably, the color stimulus 610 is spacially adjacent to the fixed reference stimulus 620. However, it is to be understood that the fixed reference stimulus could even be external to the particular display being calibrated—e.g., a gray stimulus rendered on another reference softcopy or hardcopy device.

The user then uses natural language commands on the GUI to adjust the stimulus until it appears gray and of equal lightness with respect to the background (502). Note that the goal here is to achieve a match with a reference stimulus, while the purpose of the original natural language editing command syntax was to adjust colors to produce a more pleasing image. Therefore it may be desirable to modify the syntax and structure of the natural language command to be more appropriate for a matching task. Specifically, since the target color in the current application is a known stimulus, this is no longer a variable in the color editing command. The only variables are the direction and magnitude of color change. For example, the command could be:

"Match the center patch to the background by making it [moderately] [less bluish]".

Here, the magnitude and direction are the selectable variables in the color editing command and are contained in parenthesis. These variables could be chosen, for example, from a pull-down menu.

Alternatively, it may be more intuitive to express how the patch deviates from the background:

"The center patch is [considerably] [more bluish] and [slightly] [darker] than the gray background".

The natural language command is then used to construct a 3-dimensional mathematical color transform that is applied to the target RGB values to produce an adjusted set of RGB values. Techniques to construct the color transform from natural language commands are taught, for example, in U.S. Pub. No. 2008/0007749, and involve the use of standard named color dictionaries, and the derivation of a 3-D lookup table. Note that the stimulus produced by the adjusted RGB values is intended to be a close match to the reference background stimulus. The adjusted RGB values are then used to derive calibration TRCs for the display (503). Techniques for doing this are disclosed, for example, by Cowan and in U.S. Pat. No. 7,312,799. Briefly, since the background is a 50% binary halftone pattern, it is assumed to produce a stimulus whose luminance is half that of the white point, and that is perfectly neutral, in the sense that its chromaticity is the same as that of the white point (assuming flare-free viewing conditions). The language-based visual matching task effectively provides the digital RGB values that produce a neutral patch at 50% luminance. Note from the example GUI 700 in FIG. 7 that the final adjusted RGB values producing the visual match for the particular display (specified in 8 bit encoding) were [195 195 166]. As mentioned above, this one calibration point is sufficient to uniquely calculate gamma values for the R, G, B channels. Given the simple gamma model described above, the gamma for the red channel denoted $\gamma_R$ can be obtained using the formula:

$$\gamma_R = \log(0.5)/\log(R_{adjust}) \quad (2)$$

where $R_{adjust}$ is the adjusted red value (normalized to the 0-1 range). For the given example of $R_{adjust}=195$, the normalized value is $R_{adjust}=0.7647$, and the resulting $\gamma_R=2.58$. Analogous calculations are performed to obtain gamma for the green and blue channels. In the color correction phase, the gamma function is inverted, so that the RGB signals are mapped through $f(x)=x^{1/\gamma}$ before they are displayed.

In another embodiment, points on the calibration curve can be obtained by carrying out multiple language-based tasks in a successive process. For example, once the 50% point is calibrated, this can be used to obtain the 25% and 75% points. Each additional sample can provide greater accuracy, but at the cost of greater effort and time in performing the visual tasks.

The method has been implemented and shown to improve image quality and color consistency between two displays that exhibit significantly different color characteristics. It provides a unique measurement-free method of display calibration that is intuitive for the novice user. It is readily distinguished and enforced via the inclusion of language-based commands in the calibration process. The method can be used in conjunction with any color image editing/manipulation application, including at the desktop, on mobile devices, or in a device driver or controller.

The command-based interface can be written in any GUI-supported language, such as Java. By way of example, the TRCs created from the visual matching task may then be downloaded to the video look-up tables (LUTs) driving the displays via a standard Windows™ API and then applied to the entire desktop.

While the concepts taught herein focus on deriving 1-dimensional (1D) calibration TRCs, they could be extended to derive the 3×3 characterization matrix. For example, it is possible to make judgments on memory color objects (such as oranges or flesh tones) to glean information about the display white point. As a variant, language commands could be used to adjust the memory colors to some preferred/ideal state, whereby the adjustments are used to estimate display parameters. Alternatively, the user could express, via language, how the displayed memory color deviates from an ideal/preferred state. This idea depends on the fact that there is good convergence amongst humans when it comes to memory color rendition.

The method could also be used to derive or improve color calibration for a printer.

The method illustrated in FIG. 5 may be implemented in a non-transitory computer program product that may be executed on a computer or other type of computing device. The computer program product may be a tangible computer-readable recording medium (or computer-usable data carrier) on which a control program is recorded, such as a disk, hard drive, or may be a transmittable carrier wave in which the control program is embodied as a data signal. Common forms of computer-readable media (or data carriers) include, for example, flash drives, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infra-red data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for color calibration of a color display device, the method comprising:
presenting on the color display device a first color stimulus;
receiving from a user one or more natural language commands to adjust the first color stimulus until it appears to visually match a first fixed reference stimulus in color and luminance, wherein a first adjusted color stimulus comprises a set of digital values and the natural language commands for adjusting the color stimulus comprise at least a command to match the first color stimulus to the first fixed referenced stimulus, a direction in which the adjustment takes place, and a magnitude of change along the direction;
using the digital values of the first adjusted color stimulus to derive at least one calibration tone response curve (TRC) for the color display device;
presenting on the color display device a second color stimulus;

receiving from the user one or more natural language commands to adjust the second color stimulus until it appears to visually match a second fixed reference stimulus in color and luminance, wherein the second adjusted color stimulus comprises a set of digital values and the natural language commands for adjusting the color stimulus comprise at least a command to match the second color stimulus to the second fixed referenced stimulus, a direction in which the adjustment takes place, and a magnitude of change along the direction;

using the digital values of the second adjusted color stimulus to refine the at least one TRC for the color display device; and applying the calibration function to produce corrected colors on the color display device.

2. The method of claim 1, wherein the first color stimulus comprises a gray patch.

3. The method of claim 1, wherein the first fixed reference stimulus comprises a 50% binary halftone pattern alternating between white and black stimuli.

4. The method of claim 1, further comprising:
providing a graphical user interface on the color display device that includes a calibrate command and a test command, wherein the calibrate command is used to derive a calibration TRC and the test command is used to bring up a pre-designed test image before and after calibration to show the user an improvement obtained from the calibration function.

5. The method of claim 1, wherein the first or second fixed reference stimulus is external to the color display device.

6. The method of claim 1, wherein the first fixed reference stimulus comprises a 50% binary halftone pattern.

7. The method of claim 1, wherein the first fixed reference stimulus is spatially adjacent to the first color stimulus.

8. A microprocessor-based system for color calibration of a color display device, the system comprising:
a graphical user interface that is operative to present on the color display device a first color stimulus and receive from the user one or more natural language commands to adjust the first color stimulus until it appears to visually match a first fixed reference stimulus in color and luminance, wherein a first adjusted color stimulus comprises a set of digital values and the natural language commands for adjusting the first color stimulus comprise at least a command to match the first color stimulus to the first fixed referenced stimulus, a direction in which the adjustment takes place, and a magnitude of change along the direction; and
a controller that is operative to use the digital values of the adjusted color stimulus to derive at least one calibration tone response curve (TRC) for the display device;
wherein the graphical user interface is further operative to present on the color display device a second color stimulus;
wherein the controller is further operative to receive from the user one or more natural language commands to adjust the second color stimulus until it appears to visually match a second fixed reference stimulus in color and luminance, wherein the second adjusted color stimulus comprises a set of digital values and the natural language commands for adjusting the color stimulus comprise at least a command to match the second color stimulus to the second fixed referenced stimulus, a direction in which the adjustment takes place, and a magnitude of change along the direction;
wherein the controller is further operative to using the digital values of the second adjusted color stimulus to refine the at least one TRC for the color display device;
wherein the controller is further operative to apply the calibration function to produce corrected colors on the color display device.

9. The system of claim 8, wherein the first or second color stimulus comprises a gray patch.

10. The system of claim 8, wherein the first or second fixed reference stimulus comprises a 50% binary halftone pattern alternating between white and black stimuli.

11. The system of claim 8, wherein the graphical user interface is further operative to provide a calibrate command and a test command, wherein the calibrate command is used to derive a calibration TRC and the test command is used to bring up a pre-designed test image before and after calibration to show the user an improvement obtained from the calibration function.

12. The system of claim 8, wherein the first or second fixed reference stimulus is external to the color display device.

13. The system of claim 8, wherein the first fixed reference stimulus is spatially adjacent to the first color stimulus.

14. The system of claim 8, wherein the first or second fixed reference stimulus comprises a 50% binary halftone pattern.

15. A non-transitory computer-usable data carrier storing instructions that, when executed by a computer, cause the computer to:
present on a color display device a color stimulus;
receive from a user one or more natural language commands to adjust the color stimulus until it appears to visually match a fixed reference stimulus in color and luminance, wherein an adjusted color stimulus comprises a set of digital values and the natural language commands for adjusting the color stimulus comprise at least a command to match the color stimulus to the fixed referenced stimulus, a direction in which the adjustment takes place, and a magnitude of change along the direction;
use the digital values of the adjusted color stimulus to derive at least one calibration tone response curve (TRC) for the color display device;
present on the color display device a second color stimulus;
receive from the user one or more natural language commands to adjust the second color stimulus until it appears to visually match a second fixed reference stimulus in color and luminance, wherein the second adjusted color stimulus comprises a set of digital values and the natural language commands for adjusting the color stimulus comprise at least a command to match the second color stimulus to the second fixed referenced stimulus, a direction in which the adjustment takes place, and a magnitude of change along the direction;
use the digital values of the second adjusted color stimulus to refine the at least one TRC for the color display device; and
apply the calibration function to produce corrected colors on the display device.

16. The non-transitory computer-usable data carrier of claim 15, wherein the first or second color stimulus comprises a gray patch.

17. The non-transitory computer-usable data carrier of claim 15, wherein the first or second fixed reference stimulus comprises a 50% binary halftone pattern alternating between white and black stimuli.

18. The non-transitory computer-usable data carrier of claim 15, wherein:

the color display device includes a graphical user interface that includes a calibrate command and a test command, wherein the calibrate command is used to derive a calibration TRC and the test command that is used to bring up a pre-designed test image before and after calibration to show the user an improvement obtained from the calibration function.

19. The non-transitory computer-usable data carrier of claim 15, wherein the first or second fixed reference stimulus is external to the display device.

20. The non-transitory computer-usable data carrier of claim 15, wherein the first fixed reference stimulus is spatially adjacent to the first color stimulus.

* * * * *